United States Patent
Chen et al.

(10) Patent No.: US 9,558,045 B2
(45) Date of Patent: Jan. 31, 2017

(54) REALIZING GRAPH PROCESSING BASED ON THE MAPREDUCE ARCHITECTURE

(71) Applicant: INTERNATIONAL BUSINESS MACHINES CORPORATION, Armonk, NY (US)

(72) Inventors: Guan Cheng Chen, Beijing (CN); Ju Wei Shi, Beijing (CN); Liu Tao, Beijing (CN); Chen Wang, Beijing (CN); Kun Wang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 344 days.

(21) Appl. No.: 14/168,459

(22) Filed: Jan. 30, 2014

(65) Prior Publication Data

US 2014/0215477 A1    Jul. 31, 2014

(30) Foreign Application Priority Data

Jan. 31, 2013  (CN) .......................... 2013 1 0043220

(51) Int. Cl.
*G06F 9/50* (2006.01)
*G06F 9/46* (2006.01)

(52) U.S. Cl.
CPC ............... *G06F 9/5066* (2013.01); *G06F 9/46* (2013.01)

(58) Field of Classification Search
None
See application file for complete search history.

(56) References Cited

U.S. PATENT DOCUMENTS

| | | | | |
|---|---|---|---|---|
| 6,437,804 B1* | 8/2002 | Ibe | ......................... | G06F 17/509 709/223 |
| 6,480,816 B1* | 11/2002 | Dhar | ................... | G06F 17/5022 703/14 |
| 2004/0226013 A1* | 11/2004 | Mariotti | ................ | G06F 11/008 718/100 |

(Continued)

FOREIGN PATENT DOCUMENTS

CN        102521051 A        6/2012

OTHER PUBLICATIONS

J. Cohen, Graph Twiddling in a MapReduce World, Jul.-Aug. 2009, IEEE, Computing in Science & Engineering (vol. 11, Issue: 4), p. 29-41.*

(Continued)

*Primary Examiner* — Abdullah Al Kawsar
*Assistant Examiner* — Jorge A Chu Joy-Davila
(74) *Attorney, Agent, or Firm* — Cantor Colburn LLP; Mercedes Hobson (57) ABSTRACT

A method and device for realizing graph processing based on the MapReduce architecture is disclosed in the invention. The method includes the steps of: receiving an input file of a graph processing job; predicting a MapReduce task execution time distribution of the graph processing job using an obtained MapReduce task degree-execution time relationship distribution and a degree distribution of the graph processing job; and dividing the input file of the graph processing job into input data splits of MapReduce tasks according to the predicted MapReduce task execution time distribution of the graph processing job.

16 Claims, 8 Drawing Sheets

(56) References Cited

U.S. PATENT DOCUMENTS

2011/0295855 A1* 12/2011 Wang ................ G06F 17/30584
　　　　　　　　　　　　　　　　　　　　　707/737
2012/0079498 A1*　3/2012 Kim ...................... G06F 9/5066
　　　　　　　　　　　　　　　　　　　　　718/104
2012/0278261 A1* 11/2012 Lin ........................ G06N 5/003
　　　　　　　　　　　　　　　　　　　　　706/12

OTHER PUBLICATIONS

Svendsen, Mining Maximal Cliques from Large Graphs Using MapReduce, Thesis MS Computer Engineering, Iowa State University, Ames Iowa, 2012.
Wu et al., An Efficient Distributed Subgraph Mining Algorithm in Extreme Large Graphs, Artificial Intelligence and Computational Intelligence, Springer-Verlag 2010, p. 107-115.
Cohen, "Graph Twiddling in a MapReduce World," Computing in Science & Engineering, Jul./Aug. 2009, p. 29-41.

* cited by examiner

REALIZING GRAPH PROCESSING BASED ON THE MAPREDUCE ARCHITECTURE

CROSS-REFERENCE TO RELATED APPLICATIONS

This application claims priority under 35 U.S.C. §119 from Chinese Patent Application No. 201310043220.8 filed Jan. 31, 2013, the entire contents of which are incorporated herein by reference.

BACKGROUND OF THE INVENTION

Field of the Invention

The present invention relates to graph processing, and more specifically, to a method and device for realizing graph processing based on the MapReduce architecture.

Description of Related Art

MapReduce is a software architecture proposed by Google Inc. for large scale parallel programming. MapReduce is mainly used in parallel computing on large scale data sets (larger than 1 TB). The concepts "Map" and "Reduce" and its main idea are all borrowed from functional programming languages. Current MapReduce middleware implementation requires application developers to specify a Map function for mapping a set of key-value pairs to some new key-value pairs, called as middleware key-value pairs; further, application developers are also required to specify a Reduce function for the further processing of the middleware key-value pairs outputted from the Map function. The MapReduce architecture is used for parallel computing on large-scale data sets (larger than 1 T) in most cases, and scalability can be realized through distributing large-scale operations on a data set to multiple nodes on a network to perform parallel computation, which has been widely adopted in web access log analysis, file clustering, machine learning, data statistics, statistic-based machine translation, and other fields. For example, Hadoop is a kind of MapReduce implementations. More and more cloud computing service providers have deployed the MapReduce architecture in their cloud computing systems.

Graph processing is an important kind of problems in large-scale data processing. A large amount of graph processing algorithms are involved in the relationship analysis of various entities, data mining, and various optimization problems in social networks. The MapReduce implementation of a graph processing algorithm is usually constituted by several iterations, each of which is formed by multi-step Map tasks and multi-step Reduce tasks. A graph processing algorithm needs in general multiple iterations to finally converge on a stable solution.

In existing graph processing problems, the scale of input data sets is so large that it is hardly possible to complete the computation on a single node. Thus, in the implementation of a MapReduce-based graph processing algorithm, a large graph formed by multiple nodes needs to be divided into several sub-graphs. Due to the disequilibrium of node and edge distributions in a graph, computing loads based on Map or Reduce tasks are unbalanced for each sub-graph also, for a fundamental reason there is a linear relationship between their computing complexities and the storage complexities of data structures they used (for example, adjacency list). A common dividing criterion is to divide the data set inputted into a graph processing job according to fixed data size. As a result, a "long tail" phenomenon usually occurs in current MapReduce implementations of graph algorithms, wherein some sub-computing tasks (Map or Reduce task) has an especially long running time, while other finished sub-tasks have to wait until all sub-tasks have been finished, to perform the computation in the next iteration. The essential cause of such a phenomenon is that the relationship between the computing complexity and data length of a graph processing algorithm is not necessarily linear, for example, it may be $O(n^2)$ or $O(n^3)$ relationship.

Therefore, a graph processing method for balancing computation loads of Map and Reduce tasks is desired.

SUMMARY OF THE INVENTION

In order to solve the above problem, a method and device for realizing graph processing based on the MapReduce architecture is provided.

According to one aspect of the present invention, there is provided a method for realizing graph processing based on the MapReduce architecture, including the steps of: receiving a data set of a submitted graph processing job; predicating a MapReduce task execution time distribution of the graph processing job using an obtained MapReduce task degree-execution time relationship distribution and a degree distribution of the graph processing job; dividing the data set of the graph processing job into input data splits of MapReduce tasks according to the predicted MapReduce task execution time distribution.

According to another aspect of the present invention, there is provided a device for realizing graph processing based on the MapReduce architecture, including: comprising: a receiving module, configured to receive a data set of a submitted graph processing job; a predicting module, configured to predicate a MapReduce task execution time distribution of the graph processing job using an obtained MapReduce task degree-execution time relationship distribution and a degree distribution of the graph processing job; a dividing module, configured to divide the data set of the graph processing job into input data splits of MapReduce tasks according to the predicted MapReduce task execution time distribution.

With the method and device for realizing graph processing based on MapReduce according to embodiments of the invention, computation loads of Map tasks and Reduce tasks can be balanced, so that the graph processing job can be completed efficiently.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION OF THE PREFERRED EMBODIMENTS

Some preferred embodiments will be described in more detail with reference to the accompanying drawings, in which the preferred embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
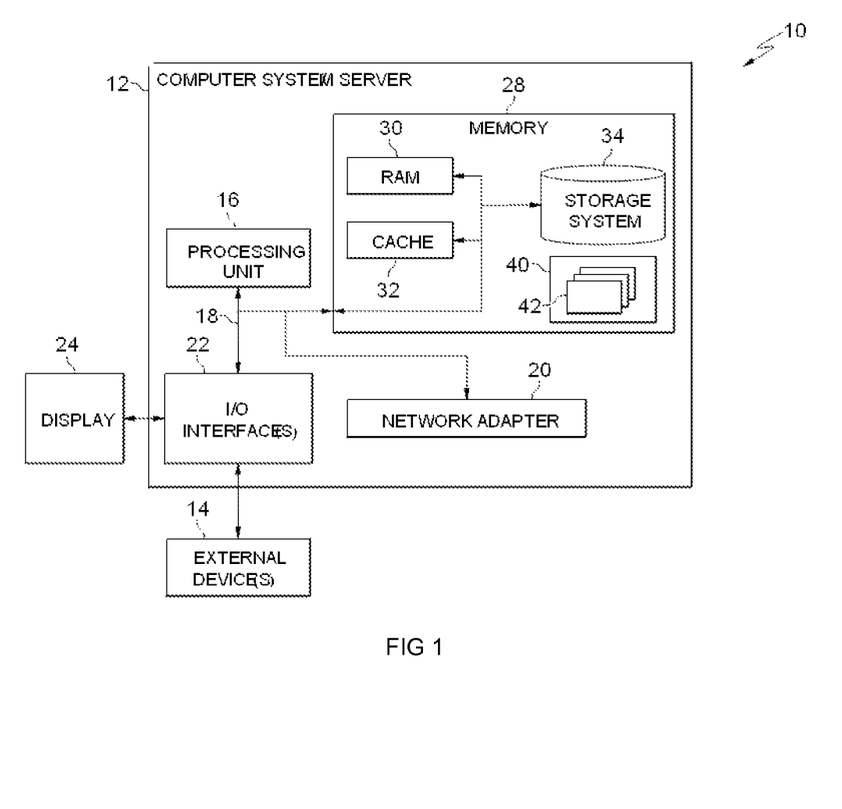
FIG. 1 shows an exemplary computer system/server 12 which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
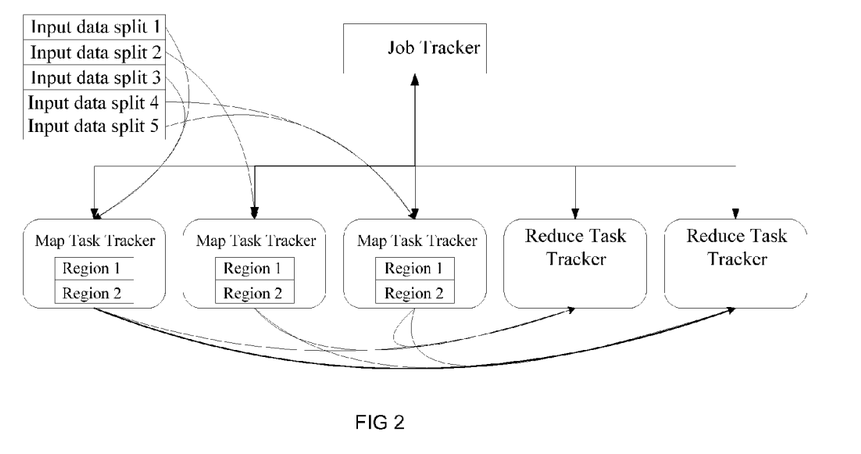
FIG. 2 shows a schematic diagram of the existing MapReduce architecture.

FIG. 2 shows a schematic diagram of the existing MapReduce architecture, wherein the MapReduce architecture has two essential services: Job Tracker and multiple Task Trackers. Generally, the Job Tracker is deployed on a master node, for receiving jobs submitted by users, scheduling all jobs in a centralized manner, managing all Task Trackers, dividing each job submitted by a user into multiple tasks including Map and Reduce tasks, and being responsible for assigning tasks to corresponding Task Trackers. A task, as the basic unit of a specific execution, needs to be assigned to an appropriate Task Tracker to execute. The multiple Task Trackers poll the Job Tracker to get tasks. A Task Tracker assigned with a Map task is a Map Task Tracker, and a Task Tracker assigned with a Reduce task is a Reduce Task Tracker. The Task Trackers report the status of various tasks to the Job Tracker while executing those tasks, thereby assisting the Job Tracker in finding out the overall condition of task execution.

Particularly, an input file is uploaded to a distributed file system deployed on a data center, and is divided into M input data splits according to a dividing rule, wherein the size of each split is in a range from 64 MB to 512 MB, and particularly can be specified through a configuration file. Program files required for the execution of tasks are also uploaded to the distributed file system, including task configuration files (including a Map function, an aggregation function, a Reduce function, etc), etc. When the Job Tracker receives a task request from a client program, it divides the task into multiple tasks including M Map tasks and R Reduce tasks, and is responsible for assigning the Map tasks or Reduce tasks to idle Task Trackers.

Then, the Map Task Trackers read corresponding input data splits according to an assigned task, and analyze to find out input key-value pairs therefrom. Next, the Map Task Trackers invoke a Map function map( ) to map the input key-value pairs to intermediate key-value pairs. The intermediate key-value pairs generated by the Map function are stored in memory. An aggregation function is invoked to aggregate for each key all values of each key of the stored intermediate key-value pairs together, and a dividing function is invoked to divide the aggregated intermediate key-value pairs into R splits, which are periodically written to R regions on local disks. When the Map tasks are completed, the Map Task Trackers notify the Job Tracker of the completion of the tasks and information about locations of the intermediate key-value pairs on the local disks.

Reduce Task Trackers read the intermediate key-value pairs from the local disks of one or more Map Task Trackers according to the location information after obtaining Reduce tasks from the Job Tracker, then sort the intermediate key-value pairs by the keys, and aggregate values of the same key together. The Reduce Task Trackers invoke a Reduce function reduce( ) to reduce those intermediate key-value pairs, and add the outputs of the Reduce function to final output files of the Reduce Task Trackers.

In the method of realizing graph processing based on MapReduce according to an embodiment of the invention, the dividing rule in the existing MapReduce architecture of dividing an input file into input data splits of a fixed size is changed to dividing the input file of the graph processing job into input data splits of tasks according to a predicted execution time distribution of the graph processing job.

Figure 3:
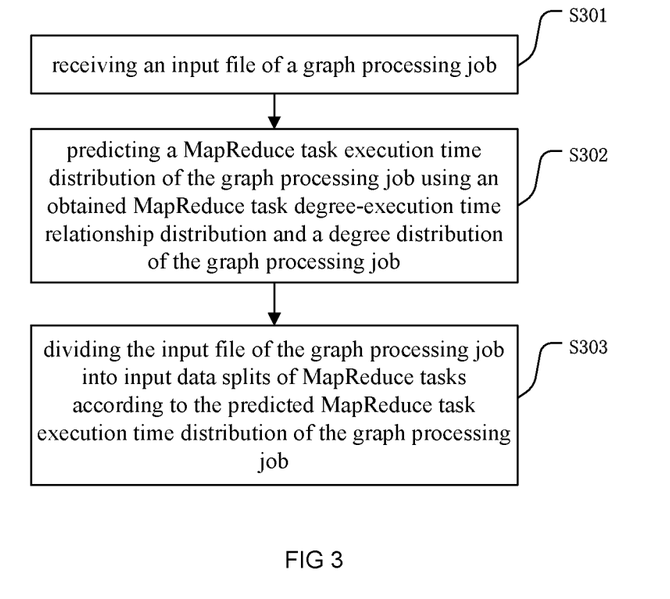
FIG. 3 shows a method for realizing graph processing based on the MapReduce architecture according to an embodiment of the invention.

FIG. 3 shows a method of realizing graph processing based on the MapReduce architecture according to an embodiment of the invention. The method comprises: at step S301, receiving an input file of a graph processing job; at step S302, predicating a MapReduce task execution time distribution of the graph processing job using an obtained MapReduce task degree-execution time relationship distribution and a degree distribution of the graph processing job; at step S303, dividing the input file of the graph processing job into input data splits of MapReduce tasks according to the predicted MapReduce task execution time distribution of the graph processing job.

At step S301, an input file of a graph processing job is received. The input file of the graph processing job comprises information about multiple nodes of the graph processing job and adjacent nodes of the multiple nodes, wherein each node is identified by a unique ID. The input file of the graph processing job is a set of data organized by key-value pairs corresponding to each node, wherein each key-value pair is formed by a key and values corresponding to the key, wherein the key is the unique ID of the key-value pair.

At step S302, a MapReduce task execution time distribution of the graph processing job is predicated using an obtained MapReduce task degree-execution time relationship distribution and a degree distribution of the graph processing job, wherein the MapReduce task degree-execution time relationship distribution represents the execution time of Map/Reduce tasks when executing nodes with different degrees, herein "degree" represents the number of nodes adjacent to a certain node, wherein the horizontal axis of the distribution represents degrees, and the vertical axis represents execution time of tasks. According to an embodiment of the invention, the task degree-execution time relationship distribution can be obtained from historical records of the tasks processing. According to another embodiment of the invention, the task degree-execution time relationship distribution can be obtained from algorithm complexities of the tasks. The obtained task degree-execution time relationship distribution can be stored in a data dictionary in advance. The degree distribution of a graph processing job can be obtained from historical records of the graph processing job. For a graph processing job that is processed for the first time, the degree distribution of the graph processing job can be obtained through a pre-process of the graph processing job, and the degree distribution of the graph processing job can be stored in a data dictionary. When predicting an execution time distribution for nodes in the graph processing job, the task degree-execution time relationship distribution and the degree distribution of the graph processing job are obtained from the data dictionary.

Figure 4:
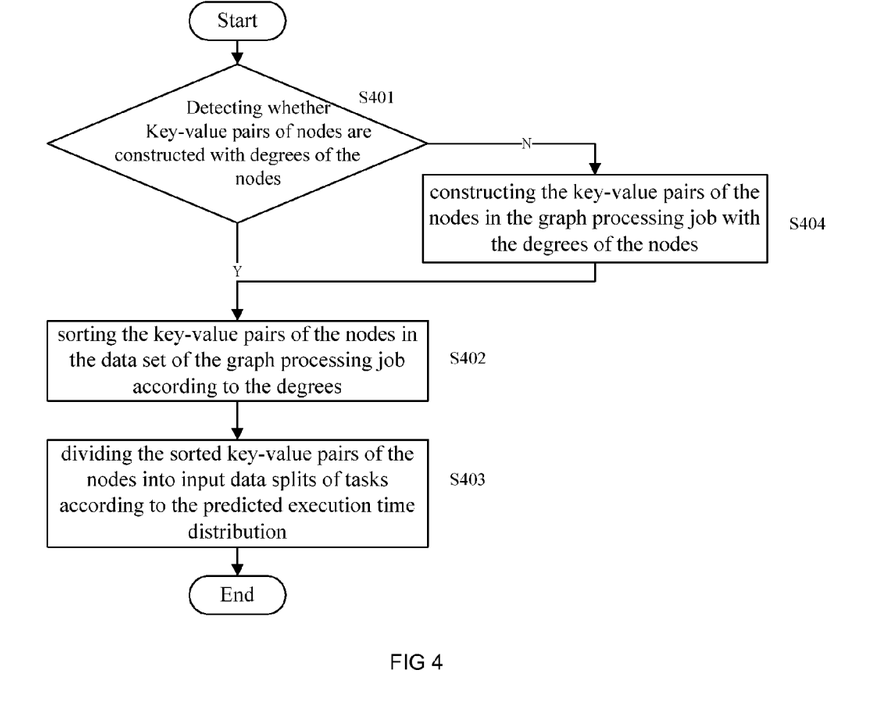
FIG. 4 shows a flow of dividing an input file of the graph processing job into input data splits of MapReduce tasks according to an execution time distribution.

At step S303, the input file of the graph processing job is divided into input data splits of MapReduce tasks according to the predicted MapReduce task execution time distribution of the graph processing job. FIG. 4 shows a flow of dividing an input file of the graph processing job into input data splits of MapReduce tasks according to an execution time distribution. At step S401, it is detected whether key-value pairs corresponding to nodes in the input file of the graph processing job are constructed with the degrees of the nodes, for example, labels can be added to the data set of the input file to indicate that the key-value pairs corresponding to the nodes are constructed with the degrees of the nodes; in response to a of yes, at step S402, the key-value pairs of the nodes in the input file of the graph processing job are sorted by degree; at step S403, the sorted key-value pairs of the nodes are divided into input data splits of tasks according to the predicted execution time distribution; in response to a detection result of no, at step S404, it is required to pre-process the input file of the graph processing job to construct the key-value pairs corresponding to the nodes in the graph processing job with degrees of the nodes, particularly, the keys of the key-value pairs corresponding to the nodes in the graph processing job are constructed with degrees of the nodes; then the flow ends after the processes of steps S402 and S403.

According to an embodiment of the invention, the MapReduce task degree-execution time relationship distribution is a Map task degree-execution time relationship distribution. A Map task execution time distribution of a graph processing job is predicated using the Map task degree-execution time relationship distribution and a degree distribution of the graph processing job. Sorted key-value pairs of nodes are equally divided into input data splits according to the predicted Map task execution time distribution. The Job Tracker assigns the divided input data splits to Map Task Trackers to execute.

According to an embodiment of the invention, the MapReduce task degree-execution time relationship distribution is a Reduce task degree-execution time relationship distribution. A Reduce task execution time distribution of a graph processing job is predicated using the Reduce task degree-execution time relationship distribution and a degree distribution of the graph processing job. Sorted key-value pairs of nodes are equally divided into input data splits according to the predicted Reduce task execution time distribution. The input data splits are inputted into a Reduce Task partitioner. The Job Tracker assigns the input data splits to Reduce Task Trackers to execute.

Figure 5:
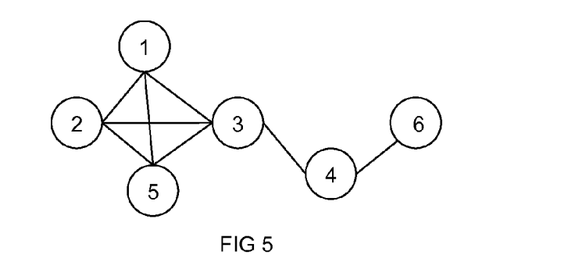
FIG. 5 shows an embodiment of achieving a graph processing job based on the MapReduce architecture of the invention.
Figure 6:
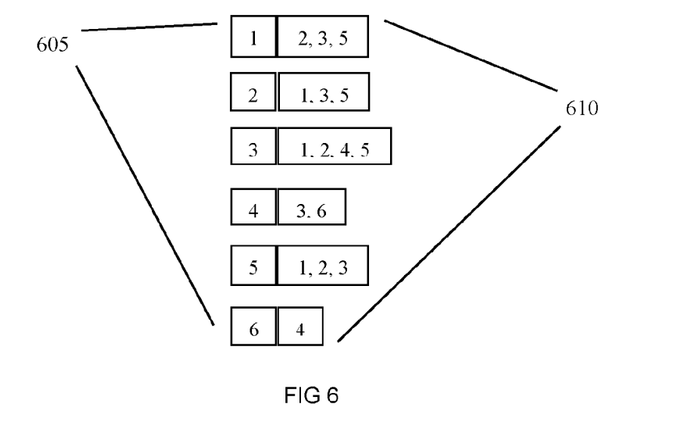
FIG. 6 shows key-value pairs in an input file of the graph processing job according to an embodiment of the invention.

FIG. 5 shows an embodiment of achieving a graph processing job based on the MapReduce architecture of the invention. The graph processing job comprises six nodes, and the input file of the graph processing job comprises key-value pairs corresponding to each node. FIG. 6 shows the key-value pairs in the input file of the graph processing job according to the embodiment of the invention, wherein the "key" 605 is identifying ID of each node and the "value" 610 represents identifying ID of adjacent nodes of the graph node.

Figure 7:
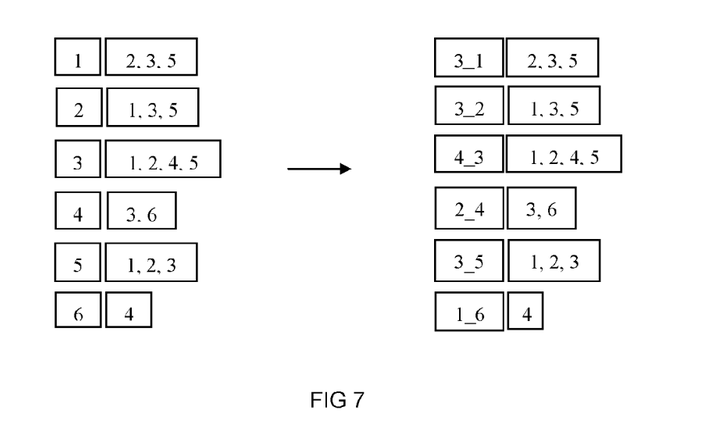
FIG. 7 shows an example of generating new key-value pairs for key-value pairs of each node according to an embodiment of the invention.

At a first step, Map Task Trackers detect whether key-value pairs corresponding to each node in the input file of the graph processing job are constructed with degrees of the nodes, particularly, whether the key of the key-value pair is constructed with the degrees of the nodes, which can be indicated by, for example, whether labels are added in the input file of the graph processing job. If it is detected that the key-value pair corresponding to each node is not constructed with the degrees of the node, a new key is generated for the key-value pair of each node, in the form of "the number of adjacent nodes _ original key". FIG. 7 shows an example of generating a new key-value pair for the key-value pair of each node according to an embodiment of the invention.

Figure 8:
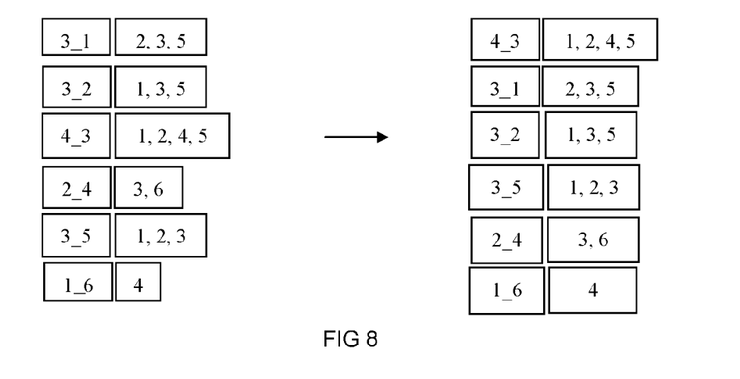
FIG. 8 shows an example of re-sorted new key-value pairs according to an embodiment of the invention.

At a second step, the new key-value pairs are sorted with the MapReduce architecture's own distributed sorting mechanism. According to an embodiment of the invention, the new key-value pairs can be sorted according to the degrees of the present nodes. FIG. 8 shows an example of re-sorted new key-value pairs according to an embodiment of the invention.

Figure 9:
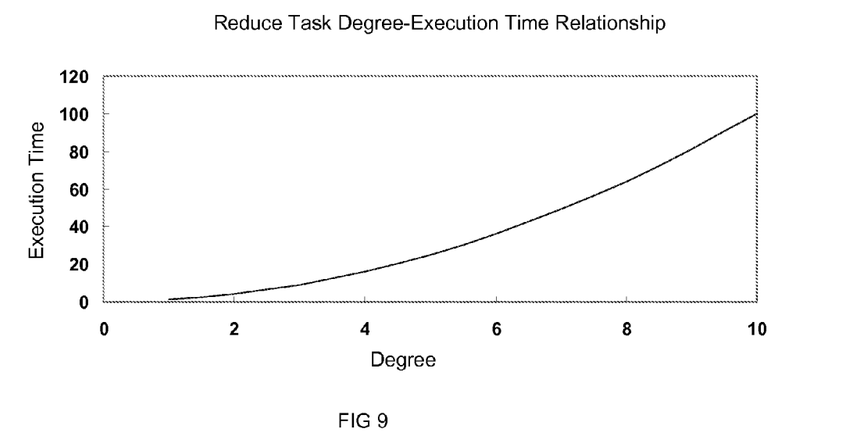
FIG. 9 shows a relationship distribution curve of Reduce tasks execution time-degrees according to an embodiment of the invention.
Figure 10:
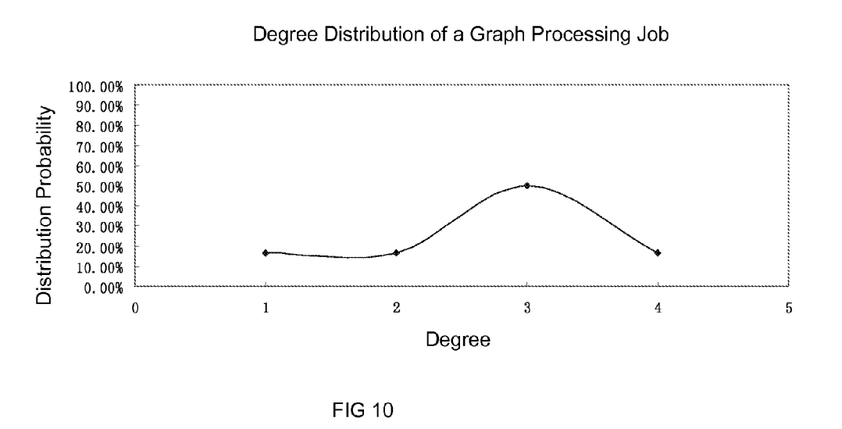
FIG. 10 shows a degree distribution curve of the graph processing job according to an embodiment of the invention.
Figure 11:
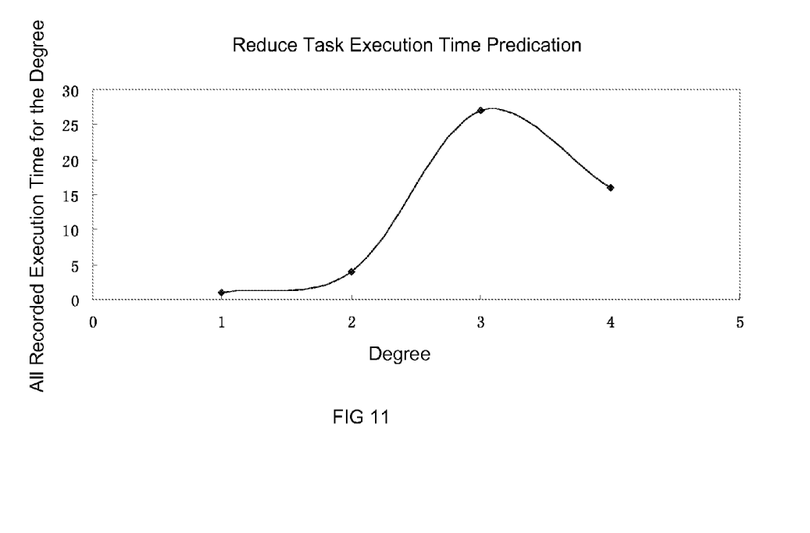
FIG. 11 shows an execution time distribution predication of Reduce tasks processing the graph processing job according to an embodiment of the invention.

At a third step, load balanced partitioning is performed by the Task Trackers according to a Reduce execution time-degree distribution curve (Reduce predictive equation) and a degree distribution curve (degree distribution) of the graph processing job obtained from a database. FIG. 9 shows a Reduce task execution time-degree distribution curve according to an embodiment of the invention, with an assumption that there is a $O(n^2)$ relationship between Reduce task execution time and degrees obtained from previous tasks, which is stored in a data dictionary. FIG. 10 shows a degree distribution curve of the graph processing job according to an embodiment of the invention, with an assumption that the degree distribution of the graph processing job has been obtained from previous tasks and is stored in a data dictionary. According to FIG. 9 and FIG. 10, as shown in FIG. 11, a predicted execution time distribution of Reduce tasks processing the graph processing job according to the embodiment of the invention can be obtained. Assume that there are two Reduce tasks, according to the predicted execution time distribution, it can be seen that, in the Reduce tasks, the execution time of processing the new key-value pair "4_3 1,2,4,5" is 16 units of time, the execution time of processing the new key-value pair "3_1 2,3,5" is 9 units of time, the execution time of processing the new key-value pair "3_2 1,3,5" is 9 units of time, the execution time of processing the new key-value pair "3_5 1,2,3" is 9 units of time, the execution time of processing the new key-value pair "2_4 3,6" is 4 units of time, and the execution time of processing the new key-value pair "1_6 4" is 1 unit of time. The total execution time of the Reduce tasks is 48 units of time. The sorted new key-value pairs in FIG. 6 are divided to get a Reduce task dividing result: the first and second new key-value pairs "4_3 1,2,4,5" and "3_1 2,3,5" are assigned to Reduce 1 to process; the third, fourth, fifth and sixth new key-value pairs "3_2 1,3,5", "3_5 1,2,3", "2_4 3,6" and "1_6 4" are assigned to Reduce 2 to process to achieve balanced loads of Reduce tasks. Without the mechanism of the invention, all of the first to third key-value pairs will be assigned to Reduce 1, which may cause load unbalance and lead to degraded performance.

Figure 12:
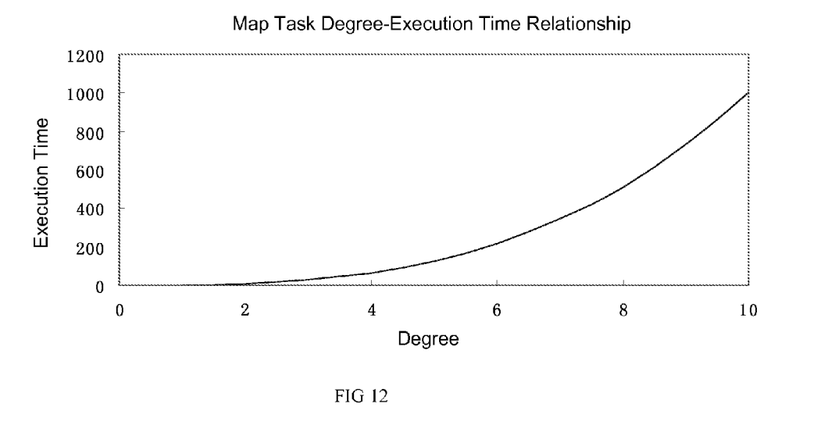
FIG. 12 shows a distribution curve of the relationships between Map task execution time and degrees according to an embodiment of the invention.
Figure 13:
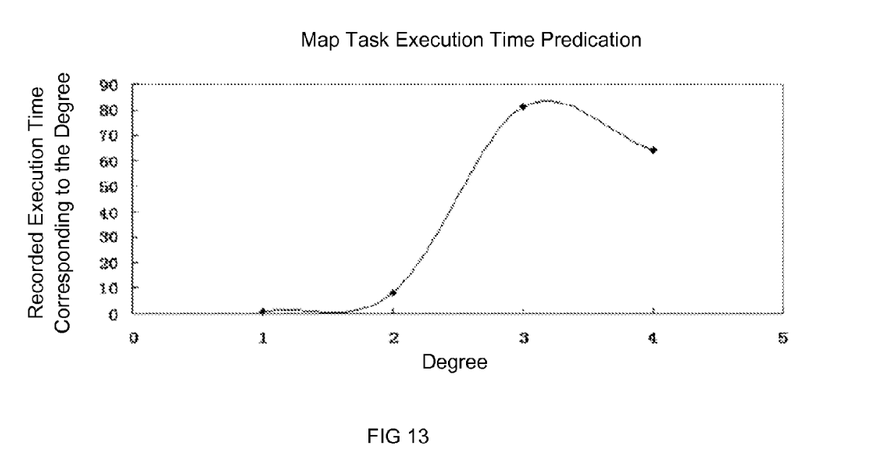
FIG. 13 shows an execution time distribution prediction of Map tasks processing the graph processing job according to an embodiment of the invention.

From a second MapReduce task, the key-value pairs of all nodes have been sorted by degree. Thereby, with regard to Map tasks, according to the same method shown at the third step above, an execution time distribution of Map tasks processing the graph processing job is predicated according to a Map task execution time-degree distribution curve and a degree distribution curve of the graph processing job. FIG. 12 shows an execution time-degree distribution curve of Map tasks according to an embodiment of the invention. Herein, assume that the complexity of the Map algorithm is $O(N^3)$. The degree distribution curve of the graph processing job is unchanged during this process, as shown in FIG. 9. According to FIG. 9 and FIG. 12, as shown in FIG. 13, a predicted execution time distribution of Map tasks processing the graph processing job according to an embodiment of the invention can be obtained. Assume that there are two Map tasks, Map 1 and Map 2. According to the predicted execution time distribution, it can be seen that, in the Map tasks, the execution time of processing the new key-value pair "4_3 1,2,4,5" is 64 units of time, the execution time of processing the new key-value pair "3_1 2,3,5" is 27 units of time, the execution time of processing the new key-value pair "3_2 1,3,5" is 27 units of time, the execution time of processing the new key-value pair "3_5 1,2,3" is 27 units of time, the execution time of processing the new key-value pair "2_4 3,6" is 8 units of time, and the execution time of processing the new key-value pair "1_6 4" is 1 unit of time. The total execution time of the Map tasks is 127 units of time. The sorted new key-value pairs in FIG. 6 are divided to get a Map task dividing result: the first new key-value pair "4_3 1,2,4,5" is assigned to Map 1 to process; the second, third, fourth, fifth and sixth new key-value pairs "3_1 2,3,5", "3_2 1,3,5", "3_5 1,2,3", "2_4 3,6" and "1_6 4" are assigned to Map 2 to process, to achieve balanced loads of the Map tasks.

For some graph iterative algorithms, when graph topology varies in multiple rounds of iteration, it is required to collect the degree distribution of the graph processing job at a fixed period. Because a built-in mechanism of the MapReduce architecture sorts the degree based key in the MapReduce task in each round of the graph processing job, variations in topology does not impact dividing accuracy.

Figure 14:
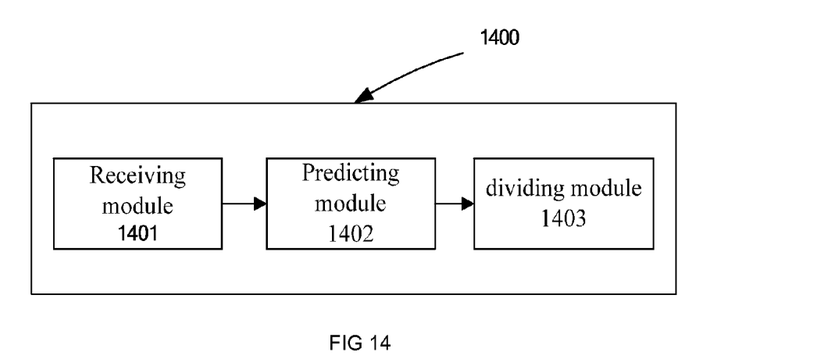
FIG. 14 shows a device 1400 for realizing graph processing based on MapReduce according to an embodiment of the invention.

Based on the same inventive concept, a device of realizing graph process based on the MapReduce architecture is further provided in the invention. FIG. 14 shows a device 1400 for realizing graph processing based on the MapReduce architecture according to an embodiment of the invention, the device comprising: a receiving module 1401, configured to receive a submitted input file of a submitted graph processing job; a predicting module 1402, configured to predicate a MapReduce task execution time distribution of the graph processing job using an obtained MapReduce task degree-execution time relationship distribution, and a degree distribution of the graph processing job; a dividing module 1403, configured to divide the input file of the graph processing job into input data splits of MapReduce tasks according to the predicted MapReduce task execution time distribution of the graph processing job.

According to an embodiment of the invention, the dividing module comprises: a detection module, configured to detect whether key-value pairs of nodes in the input file of the graph processing job are constructed with degrees of the nodes; a sorting module, configured to, in response to a detection result of yes, sort the key-value pairs of the nodes in the input file of the graph processing job according to the degrees; a dividing module, configured to divide the sorted key-value pairs into input data splits of tasks according to the predicted task execution time distribution.

According to an embodiment of the invention, the dividing module further comprises: a key-value pair constructing module, configured to in response to a detection result of no, construct key-value pairs of nodes in the input file of the graph processing job with degrees of the nodes, particularly, construct keys of the key-value pairs of the nodes in the input files of the graph processing job with degrees of the nodes; the sorting module is configured to sort the constructed key-value pairs according to the degrees; the dividing module is configured to divide the sorted key-value pairs into input data splits according to the predicted task execution time distribution.

According to an embodiment of the invention, the task degree-execution time relationship distribution is a Map task degree-execution time relationship distribution; the predicting module is configured to predicate a Map task execution time distribution of the graph processing job using the Map task degree-execution time relationship distribution and a degree distribution of the graph processing job.

According to an embodiment of the invention, the dividing module is configured to equally divide the sorted key-value pairs of the nodes into input data splits of the Map tasks according to the predicted Map task execution time distribution; a Job Tracker assigns the input data splits of the Map tasks to Map Task Trackers to execute.

According to an embodiment of the invention, the task degree-execution time relationship distribution is a Reduce task degree-execution time relationship distribution; the predicting module is configured to predicate a Reduce task execution time distribution of the graph processing job using the Reduce task degree-execution time relationship distribution and a degree distribution of the graph processing job.

According to an embodiment of the invention, the dividing module is configured to equally divide the sorted key-value pairs of the nodes into input data splits of Reduce tasks according to the predicted Reduce task execution time distribution; the input data splits of the Reduce tasks are inputted into a Reduce task partitioner; a Job Tracker assigns input data splits outputted from the partitioner to Reduce Task Trackers to execute.

According to an embodiment of the invention, the task degree-execution time relationship distribution is obtained from historical records of the task processing; the degree distribution of the graph processing job is obtained from historical records of the graph processing job. Wherein the task degree-execution time relationship is obtained from algorithm complexities of the tasks.

For the particular implementations of the various modules, reference can be made to the method of realizing graph process based on the MapReduce architecture according to an embodiment of the invention, which will not be repeated herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for realizing graph processing based on the MapReduce architecture, comprising:

receiving an input file of a graph processing job;
predicting a MapReduce task execution time distribution of the graph processing job using an obtained MapReduce task degree-execution time relationship distribution and a degree distribution of the graph processing job, wherein:
  for a Map task degree-execution time relationship distribution, the predicting of the a MapReduce task execution time distribution includes predicting a Map task execution time distribution of the graph processing job using the Map task degree-execution time relationship distribution and a degree distribution of the graph processing job; and
  for a Reduce task degree-execution time relationship distribution, the predicting of the a MapReduce task execution time distribution includes predicting a Reduce task execution time distribution of the graph processing job using the Reduce task degree-execution time relationship distribution and a degree distribution of the graph processing job; and
dividing the input file of the graph processing job into input data splits of MapReduce tasks according to the predicted MapReduce task execution time distribution of the graph processing job, wherein dividing the input file of the graph processing job into input data splits of MapReduce tasks includes:
  detecting whether key-value pairs of nodes in the input file of the graph processing job are construed with degrees of the nodes;
  responsive to detecting that the key-value pairs of nodes in the input file are constructed with degrees of the nodes, sorting the key-value pairs of the nodes according to the degrees;
  dividing the sorted key-value pairs of the nodes into substantially equal input data splits of MapReduce tasks according to the predicted MapReduce task execution time distribution of the graph processing job; and
  assigning the input data splits of the Map tasks to Map Task Trackers to execute and the input data splits of the Reduce tasks to Reduce Task Trackers to execute.

2. The method according to claim 1, wherein dividing the input file of the graph processing job into input data splits of MapReduce tasks according to the predicted MapReduce task execution time distribution of the graph processing job includes:
  responsive to detecting that the key-value pairs of nodes in the input file are not constructed with degrees of the nodes, constructing the key-value pairs of the nodes in the input file with the degrees of the nodes;
  sorting the constructed key-value pairs according to the degrees; and
  dividing the sorted key-value pairs into input data splits of MapReduce tasks according to the predicted MapReduce task execution time distribution of the graph processing job.

3. The method according to claim 2, wherein constructing the key-value pairs of the nodes in the input file of the graph processing job with the degrees of the nodes includes:
  constructing keys of the key-value pairs of the nodes in the input files of the graph processing job with the degrees of the nodes.

4. The method according to claim 1, wherein the MapReduce task degree-execution time relationship distribution is a Map task degree-execution time relationship distribution.

5. The method according to claim 1, wherein:
the MapReduce task degree-execution time relationship distribution is a Reduce task degree-execution time relationship distribution.

6. The method according to claim 5, wherein assigning the input data splits of the Reduce tasks to Reduce Task Trackers to execute includes inputting the input data splits of the Reduce tasks into a Reduce task partitioner.

7. The method according to claim 1, wherein
the MapReduce task degree-execution time relationship distribution is obtained from historical records of the MapReduce tasks processing; and
the degree distribution of the graph processing job is obtained from historical records of the graph processing job.

8. The method according to claim 1, wherein the MapReduce task degree-execution time relationship is obtained from algorithm complexities of the MapReduce tasks.

9. A device of realizing graph processing based on MapReduce architecture, comprising:
one or more computer processors;
a memory containing a program which, when executed by the one or more computer processors is configured to execute:
a receiving module that, in operation, receives an input file of a submitted graph processing job;
a predicting module that is communicatively coupled to the receiving module and that, in operation, predicts a MapReduce task execution time distribution of the submitted graph processing job using an obtained MapReduce task degree-execution time relationship distribution and a degree distribution of the graph processing job, wherein:
for a Map task degree-execution time relationship distribution, the predicting module is configured to predict a Map task execution time distribution of the graph processing job using the obtained Map task degree-execution time relationship distribution and a degree distribution of the graph processing job; and
for a Reduce task degree-execution time relationship distribution, the predicting module is configured to predict a Reduce task execution time distribution of the graph processing job using the Reduce task degree-execution time relationship distribution and a degree distribution of the graph processing job; and
a dividing module that is communicatively coupled to the predicting module and that, in operation, divides the input file of the submitted graph processing job into input data splits of MapReduce tasks according to the predicted MapReduce task execution time distribution of the submitted graph processing job, wherein the dividing module comprises:
a detection module that, in operation, detects whether key-value pairs of nodes in the input file of the graph processing job are construed with degrees of the nodes;
a sorting module that is communicatively coupled to the detection module and that in operation, in response to detecting that the key-value pairs of nodes in the input file are constructed with degrees of the nodes, sorting the key-value pairs of the nodes according to the degrees;
a dividing module that is communicatively coupled to the sorting module and that, in operation, divides the sorted key-value pairs of the nodes into substantially equal input data splits of MapReduce tasks according to the predicted MapReduce task execution time distribution of the graph processing job; and
an assigning module that is communicatively coupled to the dividing module and that, in operation, assigns the input data splits of the Map tasks to Map Task Trackers to execute and the input data splits of the Reduce tasks to Reduce Task Trackers to execute.

10. The device according to claim 9, wherein
the dividing module further comprises a key-value pair constructing module configured to construct key-value pairs of nodes in the input file of the graph processing job with degrees of the nodes in response to a detection result of no;
the sorting module is configured to sort the constructed key-value pairs according to the degrees; and
the dividing module is configured to divide the sorted key-value pairs of the nodes into input data splits of the MapReduce tasks according to the predicted MapReduce task execution time distribution of the graph processing job.

11. The device according to claim 10, wherein the key-value pair constructing module is further configured to construct keys of the key-value pairs of the nodes in the input files of the graph processing job with the degrees of the nodes in response to a detection result of no.

12. The device according to claim 9, wherein the MapReduce task degree-execution time relationship distribution is a Map task degree-execution time relationship distribution.

13. The device according to claim 9, wherein the MapReduce task degree-execution time relationship distribution is a Reduce task degree-execution time relationship distribution.

14. The device according to claim 13, wherein the dividing module is configured to input the input data splits of the Reduce tasks into a Reduce task partitioner.

15. The device according to claim 9 wherein
the MapReduce task degree-execution time relationship distribution is obtained from historical records of the MapReduce tasks processing; and
the degree distribution of the graph processing job is obtained from historical records of the graph processing job.

16. The device according to claim 9, wherein the MapReduce task degree-execution time relationship is obtained from algorithm complexities of the MapReduce tasks.

* * * * *